United States Patent
Lu

(10) Patent No.: US 9,889,636 B2
(45) Date of Patent: Feb. 13, 2018

(54) ANTI-SLIP FLOOR MAT WITH TRANSPARENT TOP SURFACE

(71) Applicant: Xiamen Sheep Anti-Fatigue Mat Co., Ltd., Xiamen (CN)

(72) Inventor: Xiangyang Lu, Xiamen (CN)

(73) Assignee: XIAMEN SHEEP ANTI-FATIGUE MAT CO., LTD., Xiamen (CN)

( * ) Notice: Subject to any disclaimer, the term of this patent is extended or adjusted under 35 U.S.C. 154(b) by 0 days.

(21) Appl. No.: 15/163,652

(22) Filed: May 24, 2016

(65) Prior Publication Data

US 2016/0368247 A1 Dec. 22, 2016

Related U.S. Application Data

(63) Continuation-in-part of application No. 14/774,144, filed on Sep. 10, 2015.

(51) Int. Cl.

| B32B 3/24 | (2006.01) |
|---|---|
| B32B 25/08 | (2006.01) |
| B32B 27/40 | (2006.01) |
| B32B 3/26 | (2006.01) |
| B32B 5/18 | (2006.01) |
| B32B 25/14 | (2006.01) |
| B32B 25/16 | (2006.01) |

(Continued)

(52) U.S. Cl.
CPC ............. *B32B 25/08* (2013.01); *B32B 3/266* (2013.01); *B32B 5/18* (2013.01); *B32B 7/08* (2013.01); *B32B 25/045* (2013.01); *B32B 25/14* (2013.01); *B32B 25/16* (2013.01); *B32B 27/40* (2013.01); *B60W 40/12* (2013.01); *B32B 2250/24* (2013.01); *B32B 2266/0278* (2013.01); *B32B 2305/022* (2013.01); *B32B 2307/412* (2013.01); *B32B 2307/744* (2013.01); *B32B 2471/04* (2013.01); *B60W 2420/22* (2013.01); *B60W 2520/16* (2013.01); *B60W 2520/18* (2013.01); *B60W 2530/20* (2013.01); *Y10T 428/24339* (2015.01); *Y10T 428/24347* (2015.01)

(58) Field of Classification Search
CPC ............ B32B 3/266; Y10T 428/24339; Y10T 428/24347
See application file for complete search history.

(56) References Cited

U.S. PATENT DOCUMENTS

| 2005/0129910 A1* | 6/2005 | Chang ....................... B32B 3/26 428/139 |
| 2012/0225249 A1* | 9/2012 | Neu .......................... B32B 3/30 428/155 |

FOREIGN PATENT DOCUMENTS

CN 201899312 U * 7/2011

\* cited by examiner

*Primary Examiner* — William P Watkins, III
(74) *Attorney, Agent, or Firm* — Gokalp Bayramoglu

(57) ABSTRACT

This invention provides an anti-slip floor mat with transparent top surface mainly includes a top surface, a PU self-skinning layer and an anti-slip layer stacked together in that order. The top surface is made of a transparent material. The PU self-skinning layer comprises foaming polyurethane and mainly formed by foaming an isocyanate with a polyether polyols intermixture, and the mass ratio of the isocyanate to the polyether polyols intermixture is 100:20~50. A plurality of through holes passing through said anti-slip layer are defined in the anti-slip layer. A surface of said PU self-skinning layer adjacent to said anti-slip layer further comprises a plurality of rivets, said rivets pass through said through holes and extend to a surface of said anti-slip layer away from said PU self-skinning layer.

18 Claims, 5 Drawing Sheets

(51) Int. Cl.
*B32B 25/04* (2006.01)
*B32B 7/08* (2006.01)
*B60W 40/12* (2012.01)

ANTI-SLIP FLOOR MAT WITH TRANSPARENT TOP SURFACE

CROSS-REFERENCE TO RELATED APPLICATIONS

This application claims the benefit under 35 U.S.C. §120 as a continuation-in-part (CIP) of U.S. Non-Provisional patent application Ser. No. 14/774,144, filed Sep. 10, 2015, the disclosure of which is incorporated by reference in its entirety.

TECHNICAL FIELD

This invention relates to a floor mat, especially relates to an anti-slip floor mat with transparent top surface.

BACKGROUND

Nowadays, there are more and more various of floor mats. Most of them are directly foamed by the polyurethane. Such PU floor mat has the advantages of good elasticity and foot feels, ease to clean and environmental friendly. However, such PU floor mat cannot be directly used in a damp environment, such as kitchen, bathroom, etc., because the friction between the floor mat and the ground is too mall, which lower the safety of the floor mat. In order to solve the problem of slipping, people tend to add an anti-slip foaming layer directly on the bottom surface of the PU floor mat. The anti-slip foaming layer is made of choroprenerubber, styrenebutadienerubber, heat-shrink elastomer foaming layer or rubber foaming layer. Slip resistance of the floor mat gets enhanced by applying the anti-slip foaming layer. However, PU foaming material is a different kind of material from the choroprenerubber and styrenebutadienerubber, which makes them have low binding capacity and hard to combine. The combined product is easy to separate from each other which influences its quality and service life. Existing floor mats, structurally, use the PU material or leather as top surface. The top surface that is made of PU material or leather, has only a single and dull color. It requires a complicated process to make the top layer a multicolored layer. Even if patterns are placed on the top surface of the PU material or leather, they are easily scraped and damaged by long usage and treading by people.

For the reasons stated above, Inventor here makes a structural improvement to the existing PU floor mat and invents an innovative anti-slip floor mat with transparent top surface.

SUMMARY OF THE INVENTION

The object of this invention is to provide an anti-slip floor mat with transparent top surface.

An anti-slip floor mat with transparent top surface mainly includes a top surface, a PU self-skinning layer and an anti-slip layer stacked together in that order.

Wherein, the top surface is made of a transparent material; the transparent material can include but not limit to: PVC film, TPU film, PE film, PP film, EVA film, and PEC film.

The PU self-skinning layer comprises foaming polyurethane and mainly formed by foaming an isocyanate with a polyether polyols intermixture, and the mass ratio of the isocyanate to the polyether polyols intermixture is 100: 20~50.

A plurality of through holes passing through said anti-slip layer are defined in the anti-slip layer.

A surface of said PU self-skinning layer adjacent to said anti-slip layer further comprises a plurality of rivets, said rivets pass through said through holes and extend to a surface of said anti-slip layer away from said PU self-skinning layer.

Furthermore, various patterns can be printed on the back side of the top surface adjacent to the PU self-skinning layer. The patterns can be clearly seen through the transparent top surface.

Furthermore, a plurality of color pastes can be added when the PU self-skinning layer is foaming, so as to dye the PU self-skinning layer. The dyed PU self-skinning layer can be seen through the transparent top surface.

Furthermore, the thickness of said top surface ranges from 0.5 mm to 2.0 mm;

Furthermore, the thickness of said polyurethane middle layer ranges from 8 mm to 20 mm;

Furthermore, the thickness of said PU self-skinning layer without said rivets ranges from 8 mm to 20 mm;

Furthermore, the thickness of said anti-slip layer ranges from 1 mm to 5 mm;

Furthermore, a shape of a cross section of said through holes on the anti-slip layer is round, rhombus, square, rectangular, triangular, parallelogram or a combination of thereof.

Furthermore, the diameter of the cross section of said through holes range from 1 mm to 20 mm.

Furthermore, the polyether polyols intermixture includes polyether polyols, crosslinking agent, composite catalysts, surfactant, foaming agent; wherein the mass ratio of the polyether polyols, crosslinking agent, composite catalysts, surfactant and foaming agent is 100:2~8:1~2.5:0.5~1: 10~20.

Furthermore, the molecular weight of said polyether polyols is in a range from 1000 to 10000.

Furthermore, the molecular weight of said polyether polyols is about 5000.

Furthermore, said anti-slip layer is made of heat-shrink elastomer foaming layer or rubber foaming layer.

Furthermore, said rubber foaming layer is made of chloroprene rubber or styrene butadiene rubber.

Furthermore, a surface of said anti-slip layer away from said PU self-skinning layer further comprises an anti-slip texture.

Furthermore, said anti-slip texture is a plurality of convex structures arranged on the surface of said anti-slip layer away from said PU self-skinning layer.

Furthermore, the plurality of convex structures is concaved in the middle to form a plurality of suction cup structures.

This invention has following advantages:

1. The anti-slip texture on the anti-slip layer has a good effect for anti-skidding. The anti-slip texture has a plurality of convex structures arranged on the surface of the anti-slip layer and a plurality of suction cup structures are arranged on the middle of the convex structure. As a result of this structure, the anti-slip layer here can have a better anti-skidding effect than general anti-slip texture.

2. The top surface of this anti-slip floor mat is made of transparent material, and therefore people can observe the color of the middle-disposed PU self-skinning layer from the transparent top surface. When there is a pattern printed on the back of the top surface, people can see it from the transparent top surface. Since the patterns are printed on the back side of the top surface, the problem of getting scraped by usage and treading by people is eliminated. Also, the color of the middle-disposed PU self-skinning layer can be seen through the transparent top surface. This way the color of the PU self-skinning layer can be the background color of the back-printed patterns on the top surface. A plurality of color pastes can be added in when the PU self-skinning layer is foaming to change its color, as a result various of background colors can be created for the back-printed patterns.

Hereinafter, this invention will be described in detail in conjunction with the accompanying drawings and embodiments.

DETAILED DESCRIPTION

Embodiment 1

Figure 2:
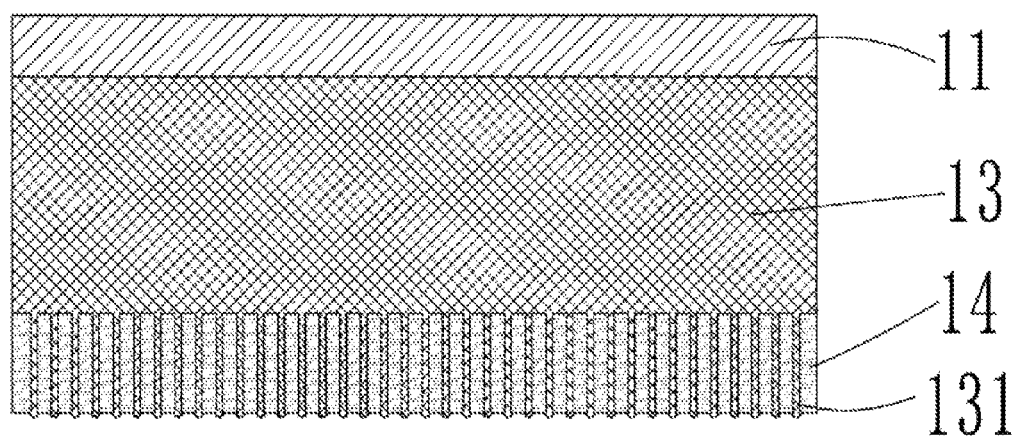
FIG. 2 illustrates a vertical section of the first embodiment of the floor mat.

As shown in FIG. 2, the first embodiment of this invention provides an anti-slip floor mat with a transparent top surface, including top surface 11, PU self-skinning layer 13 and anti-slip layer 14 stacked together in that order.

Wherein, top surface 11 is made of a transparent material. Furthermore, a plurality of patterns (not shown) can be printed on the back side (the face that contacts with self-skinning layer 13) of top surface 11 adjacent to middle-disposed PU self-skinning layer 13. The patterns can be clearly seen through the transparent top surface 11. Preferably, the thickness of top surface 11 ranges from 0.5 mm to 2.0 mm.

PU self-skinning layer 13 comprises foaming polyurethane and mainly foamed by an isocyanate and a polyether polyols intermixture. The mass ratio of the isocyanate to the polyether polyols intermixture is 100:20~50. The polyether polyols intermixture includes polyether polyols, crosslinking agent, composite catalysts, surfactant, and foaming agent. Wherein the mass ratio of the polyether polyols, crosslinking agent, composite catalysts, surfactant and foaming agent is 100:2~8:1~2.5:0.5~1:10~20. The molecular weight of said polyether polyols is in the range of 1000~10000. Preferably, the molecular weight of said polyether polyols is about 5000. Said isocyanate and the polyether polyols intermixture are mixed under the temperature ranged from 20° C. to 30° C. Furthermore, various of color pastes can be added in when PU self-skinning layer 13 is foaming, so as to dye PU self-skinning layer 13. The color of PU self-skinning layer 13 can be seen through the transparent top surface 11. Preferably, the thickness of PU self-skinning layer 13 is in the range of 8 mm to 20 mm.

Figure 4:
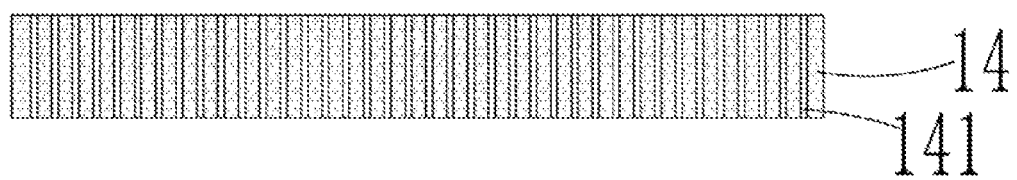
FIG. 4 illustrates a vertical section of the anti-slip layer.

As shown in FIG. 4, a plurality of through holes 141 is located in anti-slip layer 14. Correspondingly, the surface of PU self-skinning layer 13 adjacent to anti-slip layer 14 further comprises a plurality of rivets 131. Wherein, a shape of a cross section of through holes 141 is not limited and can be round, rhombus, square, rectangular, triangular, parallelogram or other irregular shape or a combination thereof. Anti-slip layer 14 can be a heat-shrink elastomer foaming layer or a rubber foaming layer, and more specifically, the rubber foaming layer can be a chloroprene rubber layer or a styrene butadiene rubber layer. Furthermore, rivets 131 pass through through holes 141 and extend to the surface of anti-slip layer 14 away from PU self-skinning layer 13. Preferably, the thickness of anti-slip layer 14 ranges from 1 mm to 5 mm; the size of the cross section of through holes 141 ranges from 1 mm to 20 mm.

Figure 1:
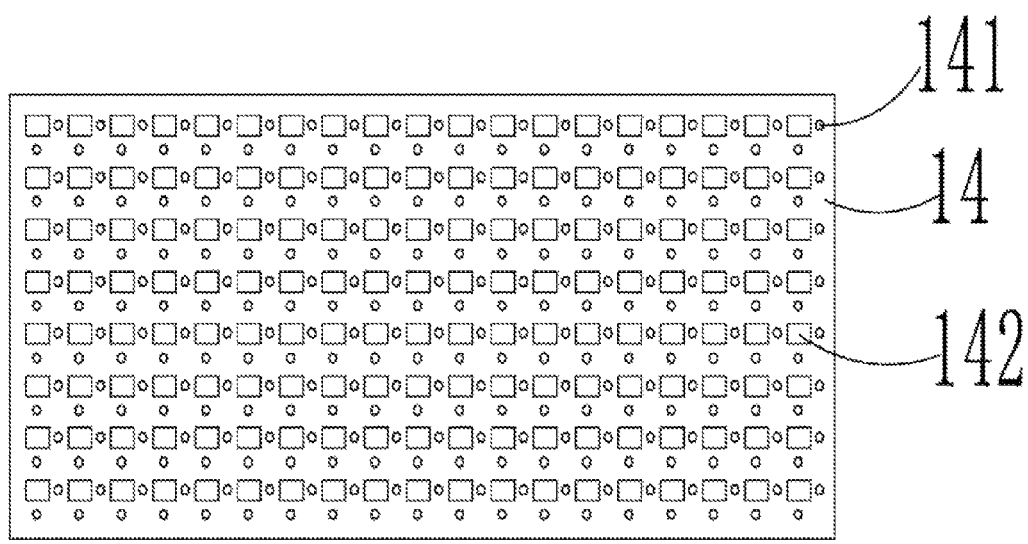
FIG. 1 illustrates a schematic diagram of the bottom of the floor mat.
Figure 5:
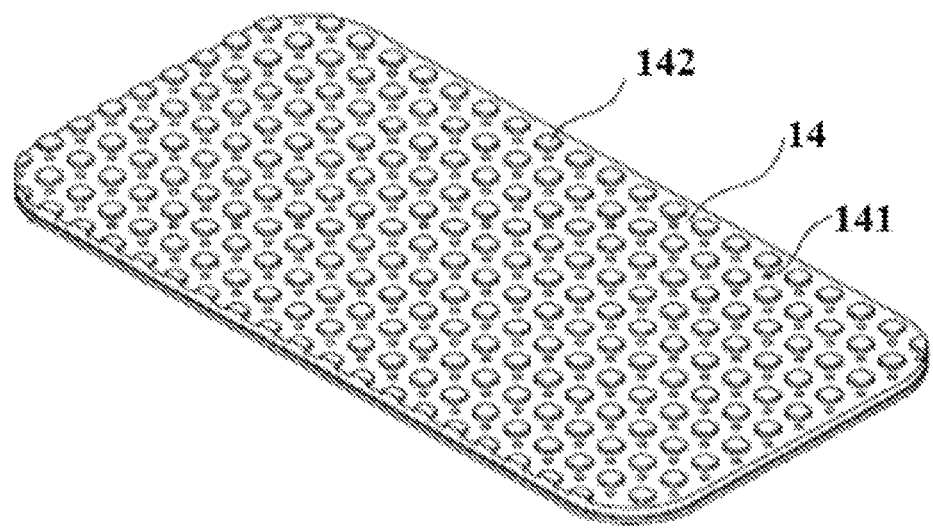
FIG. 5 illustrates a schematic diagram of the bottom of the anti-slip layer (without suction cup structure).
Figure 6:
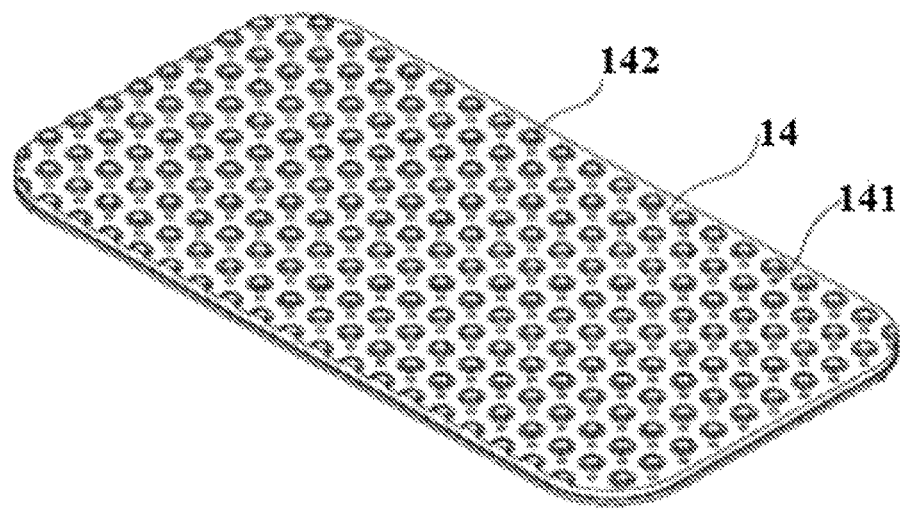
FIG. 6 illustrates another schematic diagram of the bottom of the anti-slip layer (with suction cup structure).

Furthermore, as shown in FIG. 1 and FIG. 5, the surface of anti-slip layer 14 away from PU self-skinning layer 13 further comprises an anti-slip texture. Said anti-slip texture has a plurality of convex structures 142 arranged on the surface of anti-slip layer 14 away from PU self-skinning layer 13. Further shown in FIG. 6, convex structures 142 are concaved in the middle to form a plurality of suction cup structure.

Embodiment 2

Figure 3:
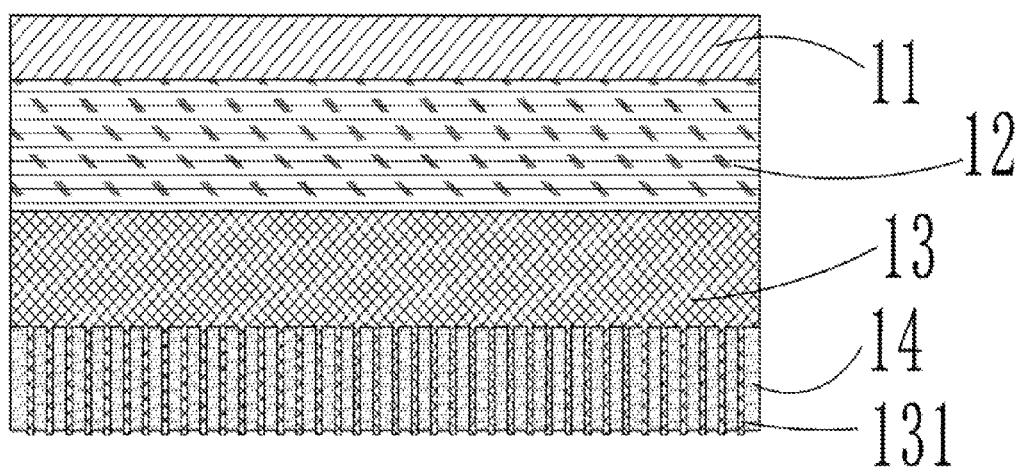
FIG. 3 illustrates a vertical section of the second embodiment of the floor mat.

As shown in FIG. 3, the second embodiment provided in this invention is an anti-slip floor mat with a transparent top surface, including top surface 11, polyurethane middle layer 12, PU self-skinning layer 13, and anti-slip layer 14 stacked together in that order.

Wherein, top surface 11 is made of transparent material. Furthermore, a plurality of patterns (not shown) can be printed on the back side (the face that contacts with self-skinning layer 13) of top surface 11 adjacent to polyurethane middle layer 12. The patterns can be clearly seen through the transparent top surface 11. Preferably, the thickness of top surface 11 ranges from 0.5 mm to 2.0 mm.

Polyurethane middle layer 12 comprises non-foam polyurethane and mainly formed by curing, an isocyanate and a polyether polyols, and the mass ratio of the isocyanate to the polether polyols is 100:19~21. During the producing process, the isocyanate and the polyether polyols are grinding and mixing at a high speed to form a first mixture. A reaction between the isocyanate and the polyether polyols with the presence of a catalyst causes the curing, and molding of the first mixture to form polyurethane middle layer 12. The first mixture has strong viscosity so that polyurethane middle layer 12 can stick to top surface 11. When the mass ratio of the isocyanate to the polyether polyols is about 100:19, polyurethane middle layer 12 is slightly softer compared to a hardness standard; when the mass ratio of the isocyanate to the polyether polyols of the present is 100:20, polyurethane middle layer 12 conforms to the hardness standard; when the mass ratio of the isocyanate to the polyether polyols is 100:21, polyurethane middle layer 12 is slightly harder compared to the hardness standard. Preferably, the thickness of polyurethane middle layer 12 ranges from 8 mm to 20 mm.

PU self-skinning layer 13 comprises foaming polyurethane and mainly foamed by an isocyanate and a polyether polyols intermixture. The mass ratio of the isocyanate to the polyether polyols intermixture is 100:20~50. The polyether polyols intermixture includes polyether polyols, crosslinking agent, composite catalysts, surfactant, and foaming agent. Wherein the mass ratio of the polyether polyols, crosslinking agent, composite catalysts, surfactant and foaming agent is 100:2~8:1~2.5:0.5~1:10~20. The molecular weight of said polyether polyols is in the range of 1000~10000. In one embodiment, the molecular weight of said polyether polyols is about 5000. Said isocyanate and the polyether polyols intermixture are mixed under the temperature ranged from 20° C. to 30° C. Preferably, the thickness of PU self-skinning 13 is in the range of 8 mm to 20 mm.

Furthermore, due to the existence of the polyurethane middle layer, various of color pastes are added in polyurethane middle layer 12 is molding so as to dye the polyurethane middle layer 12. The color of the dyed polyurethane middle layer 12 can be seen through the transparent top surface 11.

As shown in FIG. 4, a plurality of through holes 141 is located in anti-slip layer 14. Correspondingly, the surface of PU self-skinning layer 13 adjacent to anti-slip layer 14 further comprises a plurality of rivets 141. Wherein, a shape of a cross section of through holes 141 is not limited and can be round, rhombus, square, rectangular, triangular, parallelogram or other irregular shape or a combination thereof. Anti-slip layer 14 can be a heat-shrink elastomer foaming layer or a rubber foaming layer, more specially, the rubber foaming layer can be a chloroprene rubber layer or a styrene butadiene rubber layer. Furthermore, rivets 131 pass through through holes 141 and extend to the surface of anti-slip layer 14 away from PU self-skinning layer 13. Preferably, the thickness of anti-slip layer 14 ranges from 1 mm to 5 mm; the size of the cross section of through holes 141 ranges from 1 mm to 20 mm.

Furthermore, as shown in FIG. 1 and FIG. 5, the surface of anti-slip layer 14 away from PU self-skinning layer 13 further comprises an anti-slip texture. Said anti-slip texture is a plurality of convex structures 142 arranged on the surface of anti-slip layer 14 away from PU self-skinning layer 13. Further shown in FIG. 6, convex structures 142 are concaved in the middle to form a plurality of suction cup structure.

Optionally, a thin foamed PU layer (not shown) can be disposed between the PU self-skinning layer and the anti-slip layer, said thin foamed PU layer can be glued to the anti-slip layer with glue. A plurality of through holes passing through the anti-slip layer and the thin foamed PU layer are set on the anti-slip layer.

Although the present invention has been described with reference to the preferred embodiments, it is apparent to those skilled in the art that a variety of modification and changes may be made without departing from the scope of the patent for invention which is intended to defined by the appended claims.

What claimed is:

1. An anti-slip floor mat with transparent top surface, comprising:
    a top surface,
    a PU self-skinning layer disposed under the top surface,
    an anti-slip layer disposed under the PU self-skinning layer; and
    a plurality of convex structures on a back surface of the mat body; wherein,
    the top surface is made of a transparent material;
    the PU self-skinning layer comprises a foaming material, and the PU self-skinning layer is formed by foaming an isocyanate and a polyether polyols intermixture;
    a plurality of through holes pass through the anti-slip layer; and
    the PU self-skinning layer further comprises a plurality of rivets, wherein the rivets pass through the plurality of through holes and extend to a surface of the anti-slip layer away from the PU self-skinning layer; and
    the plurality of convex structures are concaved in the middle to form a plurality of suction cup structures.

2. The anti-slip floor mat according to claim 1, wherein a mass ratio of the isocyanate to the polyether polyols intermixture is in the range of 100:20~50.

3. The anti-slip floor mat according to claim 1, wherein a plurality of patterns are printed on a back face of the top surface.

4. The anti-slip floor mat according to claim 1, wherein the anti-slip floor mat further comprises a polyurethane middle layer; the polyurethane middle layer is disposed between the top surface and the PU self-skinning layer.

5. The anti-slip floor mat according to claim 4, wherein the polyurethane middle layer comprises a non-foam polyurethane, and the polyurethane middle layer is formed by curing an isocyanate and a polyether polyols; wherein a plurality of color pastes are added when the polyurethane middle layer is molding so as to dye the polyurethane middle layer.

6. The anti-slip floor mat according to claim 5, wherein a mass ratio of the isocyanate to the polyether polyols is in the range of 100:19~21.

7. The anti-slip floor mat according to claim 4, wherein the thickness of the polyurethane middle layer is in the range of 8-20 mm.

8. The anti-slip floor mat according to claim 1, wherein a plurality of color pastes are added when the PU self-skinning layer is foaming so as to dye the PU self-skinning layer.

9. The anti-slip floor mat according to claim 1, wherein the thickness of the top surface is in the range of 0.5-2.0 mm.

10. The anti-slip floor mat according to claim 1, wherein the thickness of the PU self-skinning layer is in the range of 8-20 mm.

11. The anti-slip floor mat according to claim 1, wherein the thickness of the anti-slip layer is in the range of 1-5 mm.

12. The anti-slip floor mat according to claim 1, wherein a transparent material is selected from a group consisting of: a PVC film, a TPU film, a PE film, a PP film, an EVA film, and a PEC film.

13. The anti-slip floor mat according to claim 1, wherein the diameter of the cross section of the plurality of through holes ranges from 1 mm to 20 mm.

14. The anti-slip floor mat according to claim 1, wherein the polyether polyols intermixture includes polyether polyols, a crosslinking agent, composite catalysts, a surfactant, and a foaming agent; wherein the mass ratio of the polyether polyols, the crosslinking agent, the composite catalysts, the surfactant and the foaming agent is 100:2~8:1~2.5:0.5~1:10~20.

15. The anti-slip floor mat according to claim 14, wherein the molecular weight of said polyether polyols ranges from 1000 to 10000.

16. The anti-slip floor mat according to claim 15, wherein the molecular weight of the polyether polyols is 5000.

17. The anti-slip floor mat according to claim 1, wherein the anti-slip layer is made of a heat-shrink elastomer foaming layer or a rubber foaming layer.

18. The anti-slip floor mat according to claim 17, wherein the rubber foaming layer is made of a chloroprene rubber or a styrene butadiene rubber.

* * * * *